US012624664B1

(12) United States Patent
Hanna et al.

(10) Patent No.: US 12,624,664 B1
(45) Date of Patent: May 12, 2026

(54) OVERSPEED PROTECTION FOR A TURBOCOMPRESSOR OF AN AIRCRAFT POWERPLANT ASSEMBLY

(71) Applicant: Pratt & Whitney Canada Corp., Longueuil (CA)

(72) Inventors: Michael Hanna, Beaconsfield (CA); Etienne Plamondon, Candiac (CA); Thanh Quang Duy Phan, Pte-Claire (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/083,117

(22) Filed: Mar. 18, 2025

(51) Int. Cl.
| | |
|---|---|
| *F02C 9/20* | (2006.01) |
| *B64D 33/02* | (2006.01) |
| *F02C 3/04* | (2006.01) |
| *F02C 6/12* | (2006.01) |

(52) U.S. Cl.
CPC .................. *F02C 9/20* (2013.01); *F02C 6/12* (2013.01); *B64D 2033/028* (2013.01); *B64D 2033/0293* (2013.01); *F02C 3/04* (2013.01); *F05D 2220/323* (2013.01); *F05D 2270/021* (2013.01); *F05D 2270/301* (2013.01)

(58) Field of Classification Search
CPC .... F02C 7/04; F02C 7/042; F02C 9/16; F02C 9/18; F02C 9/20; F02C 9/22; F02C 3/04; F02C 6/12; B64D 2033/028; B64D 2033/0286; B64D 2033/0293; B64D 2033/0273; F05D 2270/021
See application file for complete search history.

(56) References Cited

U.S. PATENT DOCUMENTS

| | | | |
|---|---|---|---|
| 7,485,981 B2 | 2/2009 | Schwarz | |
| 7,690,188 B2 | 4/2010 | Schwarz | |
| 7,690,189 B2 | 4/2010 | Schwarz | |
| 7,836,680 B2 | 11/2010 | Schwarz | |
| 8,015,795 B2 | 9/2011 | Schwarz | |
| 9,057,280 B2 * | 6/2015 | Morand | F02C 6/12 |
| 9,689,316 B1 * | 6/2017 | Crom | F02C 9/26 |
| 9,879,591 B2 * | 1/2018 | Thomassin | F02B 29/0406 |
| 10,190,440 B2 * | 1/2019 | Argote | F02C 9/48 |
| 10,378,549 B2 * | 8/2019 | Frampton | F02M 35/10157 |
| 10,590,842 B2 | 3/2020 | Ullyott | |
| 10,883,457 B2 * | 1/2021 | Villeneuve | F02M 35/10268 |

(Continued)

FOREIGN PATENT DOCUMENTS

| | | | | |
|---|---|---|---|---|
| GB | 2550478 A | * | 11/2017 | F02C 9/18 |
| WO | WO-03036062 A1 | * | 5/2003 | F02B 37/24 |

*Primary Examiner* — Alain Chau
(74) *Attorney, Agent, or Firm* — Getz Balich LLC

(57) ABSTRACT

A powerplant assembly includes an engine, a turbocompressor, and an overspeed protection valve. The engine includes an air intake and an engine exhaust. The turbocompressor includes a compressor section, a turbine section, and a rotational assembly. The rotational assembly includes a turbocompressor shaft, a bladed compressor rotor of the compressor section, and a turbine rotor of the turbine section. The engine and the turbocompressor form a gas flow path. The gas flow path extends from the compressor section to the air intake, through the engine, and from the engine exhaust to the turbine section. The overspeed protection valve forms a portion of the gas flow path. The overspeed protection valve is positionable in an open state and a closed state.

15 Claims, 5 Drawing Sheets

(56) References Cited

U.S. PATENT DOCUMENTS

| | | | |
|---|---|---|---|
| 11,236,681 B2 * | 2/2022 | Beauchesne-Martel | ..................... F02C 9/28 |
| 2013/0195629 A1 * | 8/2013 | Morand | ................ F01D 17/165 415/148 |
| 2016/0363001 A1 * | 12/2016 | Argote | ....................... F02C 9/48 |
| 2017/0241425 A1 * | 8/2017 | Frampton | ........ F02M 35/10386 |
| 2018/0306147 A1 * | 10/2018 | Villeneuve | ....... F02M 35/10013 |
| 2019/0003382 A1 * | 1/2019 | Schwarz | ................... F02C 6/06 |
| 2021/0087978 A1 * | 3/2021 | Beauchesne-Martel | ..................... F02C 9/20 |
| 2025/0109695 A1 * | 4/2025 | Miller | ....................... F02C 9/50 |

* cited by examiner

OVERSPEED PROTECTION FOR A TURBOCOMPRESSOR OF AN AIRCRAFT POWERPLANT ASSEMBLY

TECHNICAL FIELD

This disclosure relates generally to aircraft powerplant assemblies and, more particularly, to turbocompressor overspeed protection.

BACKGROUND OF THE ART

Aircraft may frequently include at least one powerplant assembly forming part of a propulsion system or other unit of rotational equipment (e.g., an auxiliary power unit) of the aircraft. In some cases, these powerplant assemblies may include a turbocompressor configured to facilitate improved powerplant assembly performance, for example, by supplying compressed air for use in an engine combustion process. Various turbocompressor systems and methods for their operation are known in the art. While these known systems and methods may be suitable for their intended purposes, there is always room in the art for improvement.

SUMMARY

According to an aspect of the present disclosure, a powerplant assembly for an aircraft includes an engine, a turbocompressor, and an overspeed protection valve. The engine includes an air intake and an engine exhaust. The turbocompressor includes a compressor section, a turbine section, and a rotational assembly. The rotational assembly includes a turbocompressor shaft, a bladed compressor rotor of the compressor section, and a turbine rotor of the turbine section. The turbocompressor shaft interconnects the bladed compressor rotor and the bladed turbine rotor. The engine and the turbocompressor form a gas flow path of the powerplant assembly. The gas flow path extends from the compressor section to the air intake, through the engine, and from the engine exhaust to the turbine section. The overspeed protection valve forms a portion of the gas flow path. The overspeed protection valve is positionable in an open state and a closed state. The overspeed protection valve in the open state is operable to direct a gas flow along the gas flow path. The overspeed protection valve in the closed state is operable to obstruct the gas flow along the gas flow path to the turbine section.

In any of the aspects or embodiments described above and herein, the engine may include an engine shaft, and the engine shaft may be coupled with the turbocompressor shaft.

In any of the aspects or embodiments described above and herein, the powerplant assembly may further include a geartrain coupling the engine shaft and the turbocompressor shaft.

In any of the aspects or embodiments described above and herein, the powerplant assembly may further include a propulsor rotor, and the propulsor rotor may be coupled with the engine shaft and the turbocompressor shaft.

In any of the aspects or embodiments described above and herein, the powerplant assembly may further include a duct assembly forming the gas flow path from the compressor section to the engine, and the overspeed protection valve may be disposed at the duct assembly.

In any of the aspects or embodiments described above and herein, the powerplant assembly may further include a duct assembly forming the gas flow path from the engine to the turbine section, and the overspeed protection valve may be disposed at the duct assembly.

In any of the aspects or embodiments described above and herein, the overspeed protection valve may be operable to sense a gas pressure along the gas flow path and change position from the open state to the closed state when the gas pressure decreases to a closing pressure setting of the overspeed protection valve.

In any of the aspects or embodiments described above and herein, the overspeed protection valve may be operable to change position from the closed state to the open state when the gas pressure increases to an opening pressure setting of the overspeed protection valve.

In any of the aspects or embodiments described above and herein, the powerplant assembly may further include a pressure sensor and a controller, the pressure sensor may be connected in fluid communication with the gas flow path upstream of the overspeed protection valve, the controller may be connected in signal communication with the overspeed protection valve and the pressure sensor, the controller may include a processor connected in signal communication with a non-transitory memory storing instructions which, when executed by the processor, may cause the processor to: measure a gas pressure along the gas flow path using the pressure sensor, identify a presence or an absence of a low-pressure condition using the measured gas pressure, and control the overspeed protection valve to change position from the open state to the closed state in response to identifying the presence of the low-pressure condition.

In any of the aspects or embodiments described above and herein, identifying the presence or the absence of the low-pressure condition may include comparing the measured gas pressure to a pressure threshold, and the presence of the low-pressure condition may be identified where the measured pressure is less than the pressure threshold.

According to another aspect of the present disclosure, a powerplant assembly for an aircraft includes a propulsor rotor, an engine, a turbocompressor, and an overspeed protection valve. The engine includes an air intake, an engine exhaust, and an engine shaft. The engine shaft is coupled with the propulsor rotor. The turbocompressor includes a compressor section, a turbine section, and a rotational assembly. The rotational assembly includes a bladed compressor rotor of the compressor section and a turbine rotor of the turbine section. The rotational assembly is coupled with the propulsor rotor. The engine and the turbocompressor form a gas flow path of the powerplant assembly. The gas flow path extends from the compressor section to the air intake, through the engine, and from the engine exhaust to the turbine section. The overspeed protection valve forms a portion of the gas flow path. The overspeed protection valve is positionable in an open state and a closed state. The overspeed protection valve in the open state is operable to direct a gas flow along the gas flow path. The overspeed protection valve in the closed state is operable to obstruct the gas flow along the gas flow path to the turbine section.

In any of the aspects or embodiments described above and herein, the powerplant assembly may further include a duct assembly forming the gas flow path from the compressor section to the engine, and the overspeed protection valve may be disposed at the duct assembly.

In any of the aspects or embodiments described above and herein, the powerplant assembly may further include a duct assembly forming the gas flow path from the engine to the turbine section, and the overspeed protection valve may be disposed at the duct assembly.

In any of the aspects or embodiments described above and herein, the overspeed protection valve may be operable to sense a gas pressure along the gas flow path and change position from the open state to the closed state when the gas pressure decreases to a closing pressure setting of the overspeed protection valve.

In any of the aspects or embodiments described above and herein, the powerplant assembly may further include a pressure sensor and a controller, the pressure sensor may be connected in fluid communication with the gas flow path upstream of the overspeed protection valve, the controller may be connected in signal communication with the overspeed protection valve and the pressure sensor, the controller may include a processor connected in signal communication with a non-transitory memory storing instructions which, when executed by the processor, may cause the processor to: measure a gas pressure along the gas flow path using the pressure sensor, identify a presence or an absence of a low-pressure condition using the measured gas pressure, and control the overspeed protection valve to change position from the open state to the closed state in response to identifying the presence of the low-pressure condition.

According to another aspect of the present disclosure, a method for preventing an overspeed condition of a bladed turbine rotor of a turbocompressor of a powerplant assembly for an aircraft includes driving rotation of a propulsor rotor with an engine shaft of an engine, the engine shaft coupled with the propulsor rotor, directing compressed air from a compressor section of the turbocompressor to the engine along a gas flow path, directing combustion exhaust gas from the engine to a turbine section of the turbocompressor to drive rotation of a rotational assembly of the turbocompressor, the rotational assembly including the bladed turbine rotor at the turbine section and a bladed compressor rotor at the compressor section, and preventing an overspeed condition of the bladed turbine rotor by obstructing the gas flow path with an overspeed protection valve by changing a position of the overspeed protection valve from an open state to a closed state to in response to a decrease in gas pressure within the gas flow path between the compressor section and the turbine section.

In any of the aspects or embodiments described above and herein, preventing the overspeed condition of the bladed turbine rotor may include preventing the overspeed condition of the bladed turbine rotor with the bladed turbine rotor decoupled from the bladed compressor rotor.

In any of the aspects or embodiments described above and herein, driving rotation of the propulsor rotor with the engine shaft may include additionally driving rotation of the propulsor rotor with the rotational assembly, and the rotational assembly may be coupled with the propulsor rotor.

In any of the aspects or embodiments described above and herein, obstructing the gas flow path with the overspeed protection valve may include obstructing the compressed air from the compressor section to the engine along the gas flow path.

In any of the aspects or embodiments described above and herein, obstructing the gas flow path with the overspeed protection valve may include obstructing the combustion exhaust gas from the engine to the turbine section along the gas flow path.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
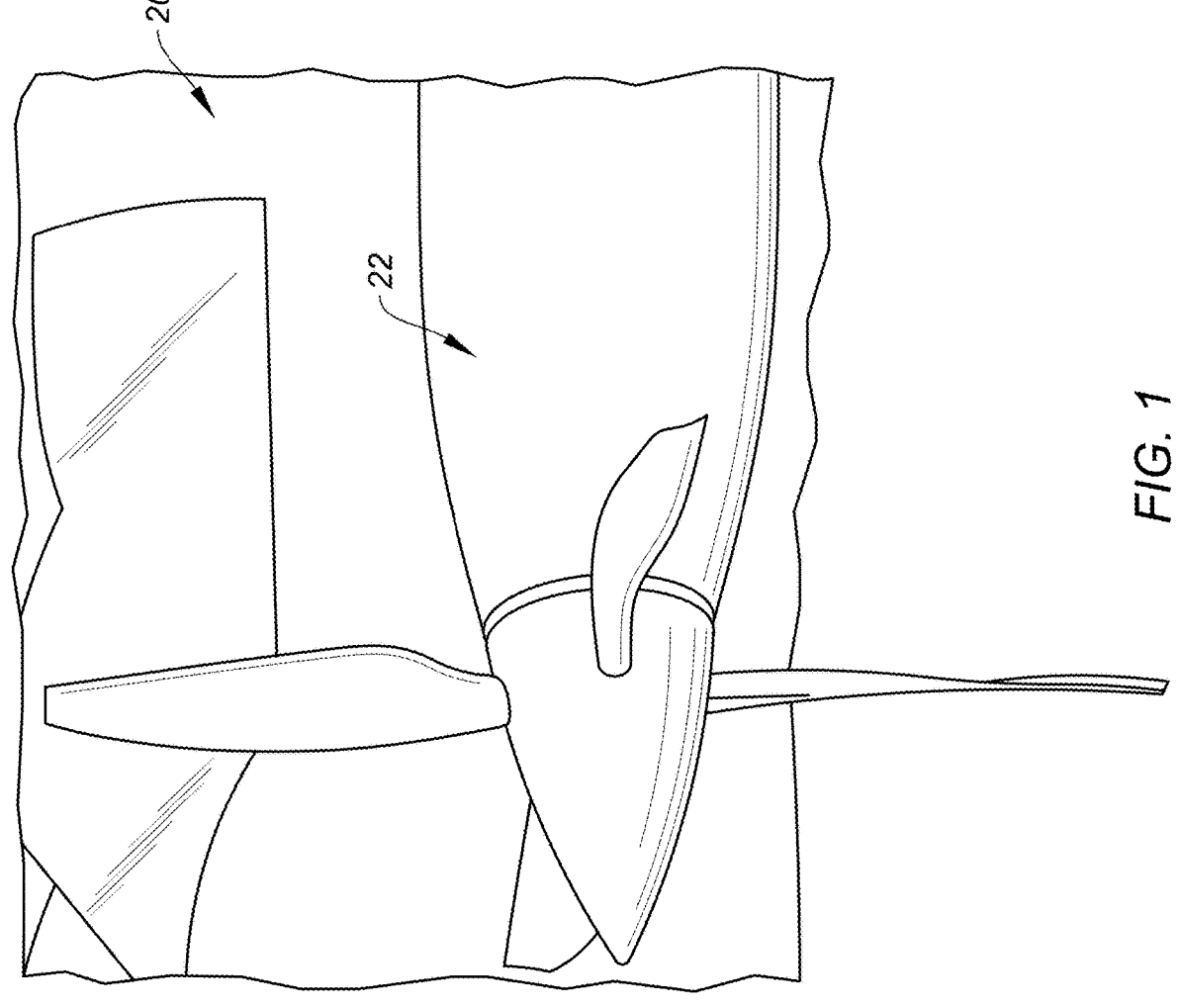
FIG. 1 illustrates an aircraft including a propulsion system, in accordance with one or more embodiments of the present disclosure.

FIG. 1 illustrates an aircraft 20 including at least one propulsion system 22. The aircraft 20 of FIG. 1 is a fixed-wing aircraft (e.g., an airplane). However, the aircraft 20 may alternatively be a rotary-wing aircraft (e.g., a helicopter or other rotorcraft), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
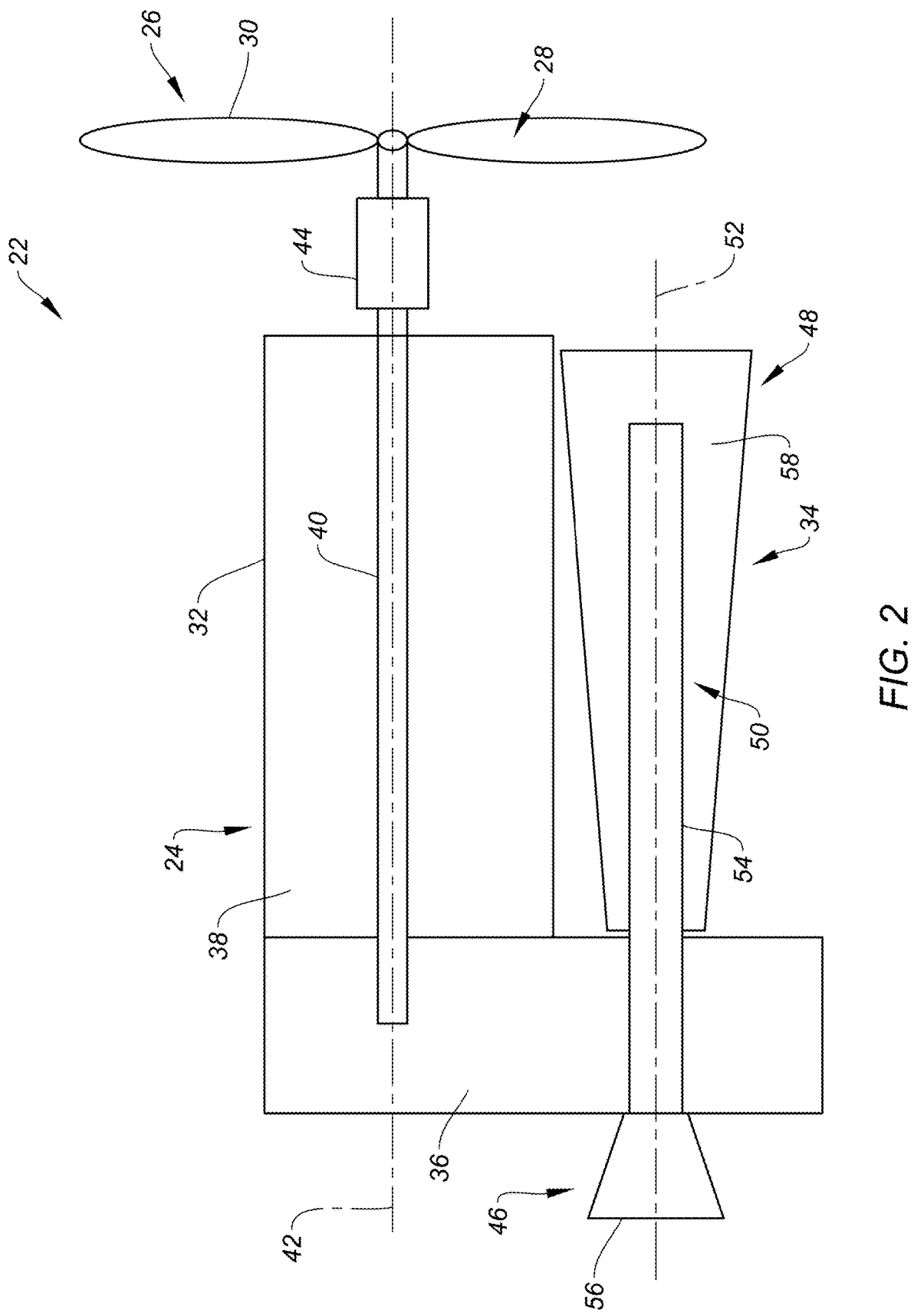
FIG. 2 schematically illustrates a powerplant assembly for an aircraft, in accordance with one or more embodiments of the present disclosure.

FIG. 2 schematically illustrates a powerplant assembly 24. As shown in FIG. 2, the powerplant assembly 24 may form a portion of the propulsion system 22. Alternatively, the powerplant assembly 24 may form a portion of an electric power system (or more generally an electric machine) such as, but not limited to, an auxiliary power unit (APU) for the aircraft 20. While the powerplant assembly 24 is described herein with respect to aircraft applications, aspects of the present disclosure powerplant assembly 24 may also be equally applicable to ground-based powerplant applications (e.g., ground-based power generation, ground-based vehicles, etc.). The propulsion system 22 of FIG. 2 includes the powerplant assembly 24 and a mechanical load 26. The mechanical load 26 may be configured as or otherwise include a rotor 28 mechanically driven by the powerplant assembly 24. This driven rotor 28 may be a bladed propulsor rotor 30 (e.g., an air mover or "propulsor") where the powerplant assembly 24 is (or is part of) the propulsion system 22, as shown in FIG. 2. The propulsor rotor 30 (e.g., a propeller, a rotorcraft rotor, etc.) includes a plurality of rotor blades arranged circumferentially around and connected to at least (or only) one rotor disk or hub. Alternatively, the driven rotor 28 may be a generator rotor in an electric power generator (or more generally an electric machine).

The powerplant assembly 24 includes an engine 32, a turbocompressor 34, and a geartrain 36. The engine 32 of FIG. 2 is configured as an intermittent combustion engine. For example, the engine 32 may be configured as a reciprocating engine (e.g., a piston engine), a rotary engine (e.g., a Wankel engine), or the like. The engine 32 includes a rotor assembly 38 and an engine shaft 40 (e.g., a crankshaft). The rotor assembly 38 is coupled with the engine shaft 40 and configured to drive rotation of the engine shaft 40 about a rotational axis 42. The engine shaft 40 is coupled with the driven rotor 28 such that rotation of the engine shaft 40 by the rotor assembly 38 drives rotation of the driven rotor 28. For example, the engine shaft 40 may be coupled with the driven rotor 28 by a geartrain 44 (e.g., a transmission, a speed change device, an epicyclic geartrain, etc.). The turbocompressor 34 includes a compressor section 46, a turbine section 48, and a rotational assembly 50 (e.g., a spool). The rotational assembly 50 is rotatable about a rotational axis 52. The rotational assembly 50 includes a shaft 54, a bladed compressor rotor 56 of the compressor section 46, and a bladed turbine rotor 58 of the turbine section 48. The shaft 54 interconnects the bladed compressor rotor 56 and the bladed turbine rotor 58. The geartrain 36 (e.g., a transmission, a speed change device, an epicyclic geartrain, etc.) couples the rotational assembly 50 (e.g., the shaft 54) with the engine shaft 40.

In operation, ambient air is received by the compressor section 46 and compressed by rotation of the bladed compressor rotor 56. This compressed air is directed to an air intake of the engine 32 along a gas flow path to facilitate an internal combustion process of the engine 32. This internal combustion process drives rotation of the engine shaft 40, as well as the bladed propulsor rotor 30 (e.g., through the geartrain 44). Combustion exhaust gas from the engine 32 is directed along the gas flow path to the turbine section 48 and across the bladed turbine rotor 58, thereby causing the bladed turbine rotor 58 to rotate and rotationally drive the rotational assembly 50. The rotation of the rotational assembly 50 additionally applies power to the engine shaft 40 through the geartrain 36, allowing the rotationally assembly 50 assist the engine 32 in rotationally driving the bladed propulsor rotor 30.

In some rare circumstances, a potential mechanical failure of the rotational assembly 50 may cause the bladed turbine rotor 58 to decouple from its mechanical loads including the geartrain 36 and/or the bladed compressor rotor 56. For example, the bladed turbine rotor 58 may become decoupled from its mechanical loads through disconnection of the bladed turbine rotor 58 from the shaft 54, a failure of the shaft 54 (e.g., a shaft shear) between the bladed turbine rotor 58 and its mechanical loads, or another rotational assembly 50 mechanical failure which causes the bladed turbine rotor 58 to rotate freely relative to other components of the rotational assembly 50. As a result, the bladed turbine rotor 58 may experience rapid unloading and acceleration (e.g., an overspeed condition). If uncorrected, this rapid acceleration of the bladed turbine rotor 58 could, under some conditions, lead to bladed turbine rotor 58 damage as well as damage to other components of the powerplant assembly 24.

Figure 3:
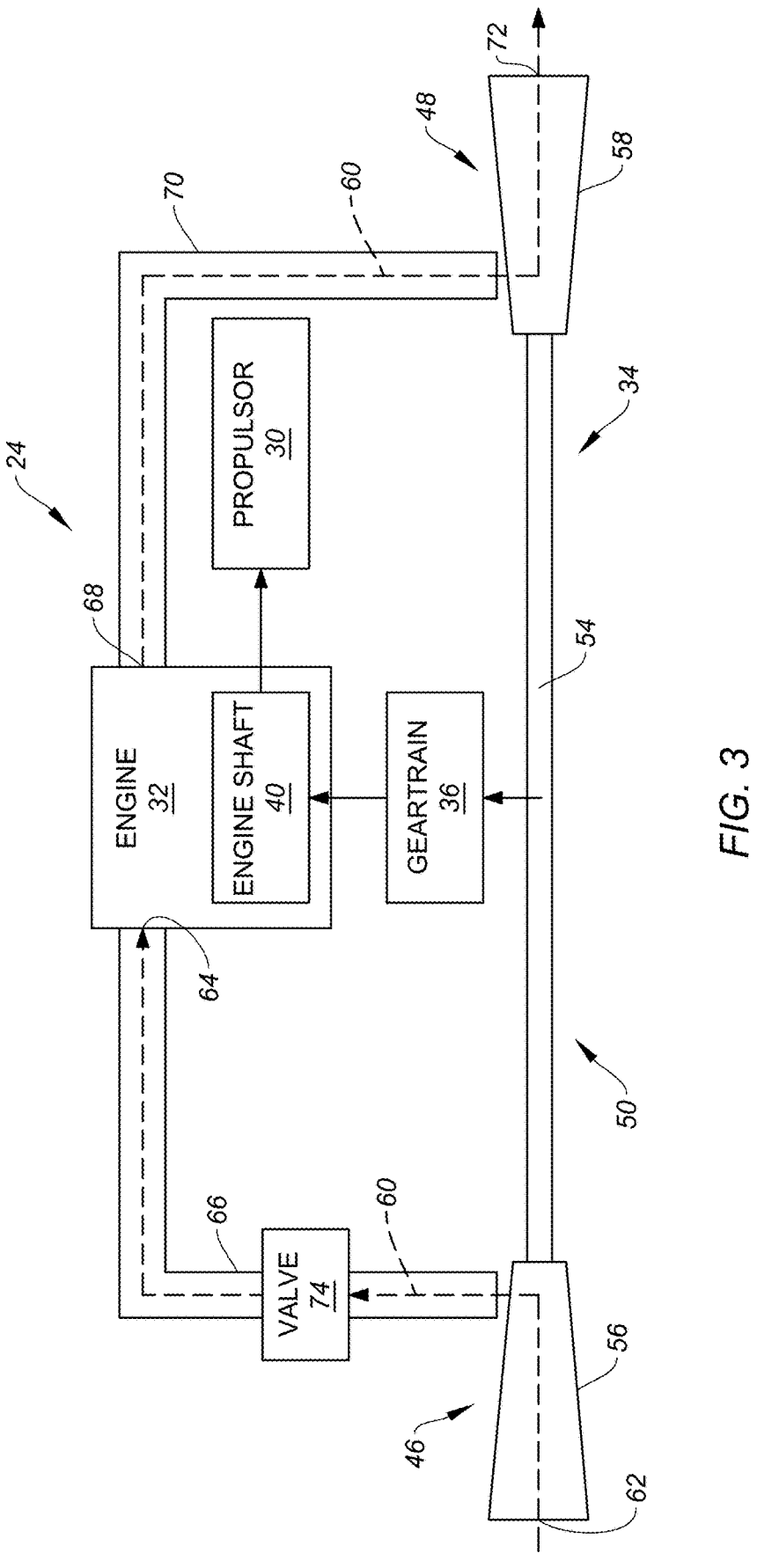
FIG. 3 schematically illustrates a portion of the powerplant assembly, in accordance with one or more embodiments of the present disclosure.

FIG. 3 schematically illustrates the powerplant assembly 24 showing a gas flow path 60 through the powerplant assembly 24 in greater detail. Ambient air is directed into an inlet 62 of the compressor section 46 along the gas flow path 60. Compressed air is directed from the compressor section 46 to an air intake 64 of the engine 32 through a duct assembly 66 forming the gas flow path 60. Combustion exhaust gas is directed from an engine exhaust 68 of the engine 32 to the turbine section 48 through a duct assembly 70 forming the gas flow path 60. This combustion exhaust gas is directed through the turbine section 48 along the gas flow path 60 to an outlet 72 of the turbine section 48. The duct assemblies 66, 70 may include ducts, pipes, tubes, hoses, manifolds, and/or other suitable conduits configured to convey gas flow along the gas flow path 60.

The powerplant assembly 24 further includes an overspeed protection valve 74. The overspeed protection valve 74 of FIG. 3 is disposed on the duct assembly 66 along and further forming the gas flow path 60. The overspeed protection valve 74 is operable in an open state and a closed state. In the open state, the overspeed protection valve 74 permits air flow through the duct assembly 66 from the compressor section 46 to the air intake 64 along the gas flow path 60. In the closed state, the overspeed protection valve 74 obstructs all or substantially all air flow through the duct assembly 66 from the compressor section 46 to the air intake 64 along the gas flow path 60.

The overspeed protection valve 74 is operable to change position from the open state to the closed state or from the closed state to the open state in response to a sensed pressure within the duct assembly 66, for example, upstream of the overspeed protection valve 74 relative to the gas flow path 60. In particular, the overspeed protection valve 74 is operable to change position from the open state to the closed state when the sensed pressure within the duct assembly 66 is or decreases below a closing pressure setting. Similarly, the overspeed protection valve 74 may be operable to change position from the closed state to the open state when the sensed pressure within the duct assembly 66 is or increases above an opening pressure setting. The overspeed protection valve 74 may have an integrated pressure sensing configuration such that the overspeed protection valve 74 may sense the pressure within the duct assembly 66 and change position from the open state to the closed state or from the closed state to the open state without external control (e.g., remote control by a pilot, an external processing system, etc.). Examples of the overspeed protection valve 74 include, but are not limited to, low-pressure shutoff valve (LPSO) configurations such as a pilot-operated low-pressure shutoff valve or a check valve with low-pressure cutoff operable to rapidly close at the closing pressure setting. Other examples of the overspeed protection valve 74 include a solenoid valve having a pressure switch (e.g., an integrated pressure switch) operable to complete or interrupt an electrical circuit including the solenoid valve to effect positioning of the solenoid valve from the open state to the closed state at the closing pressure setting.

During operation of the powerplant assembly 24, the overspeed protection valve 74 may typically be positioned in the open state to direct compressed air flow from the compressor section 46 to the air intake 64 along the gas flow path 60 to facilitate the internal combustion process of the engine 32. In the event of a turbine decoupling failure, decoupling of the bladed turbine rotor 58 from the bladed compressor rotor 56 may cause the bladed compressor rotor 56 to decelerate, thereby reducing a pressure of the compressed air directed through the duct assembly 66 along the gas flow path 60 to the engine 32. As the air pressure at and/or upstream of the overspeed protection valve 74 decreases below the closing pressure setting, the overspeed protection valve 74 changes position from the open state to the closed state to obstruct all or substantially all air flow through the duct assembly 66 from the compressor section 46 to the air intake 64 along the gas flow path 60. Isolation of this compressed air from the compressor section 46 to the engine 32 (e.g., the air intake 64) stops the combustion process within the engine 32, thereby cutting off combustion gas flow to the turbine section 48 slowing down the bladed turbine rotor 58 and preventing an overspeed condition of the bladed turbine rotor 58. Accordingly, the overspeed protection valve 74 (e.g., of FIG. 3) facilitates integrated pressure sensing and mechanical control, providing turbine overspeed protection while also reducing reliance on electronic systems and minimizing failure points.

Figure 4:
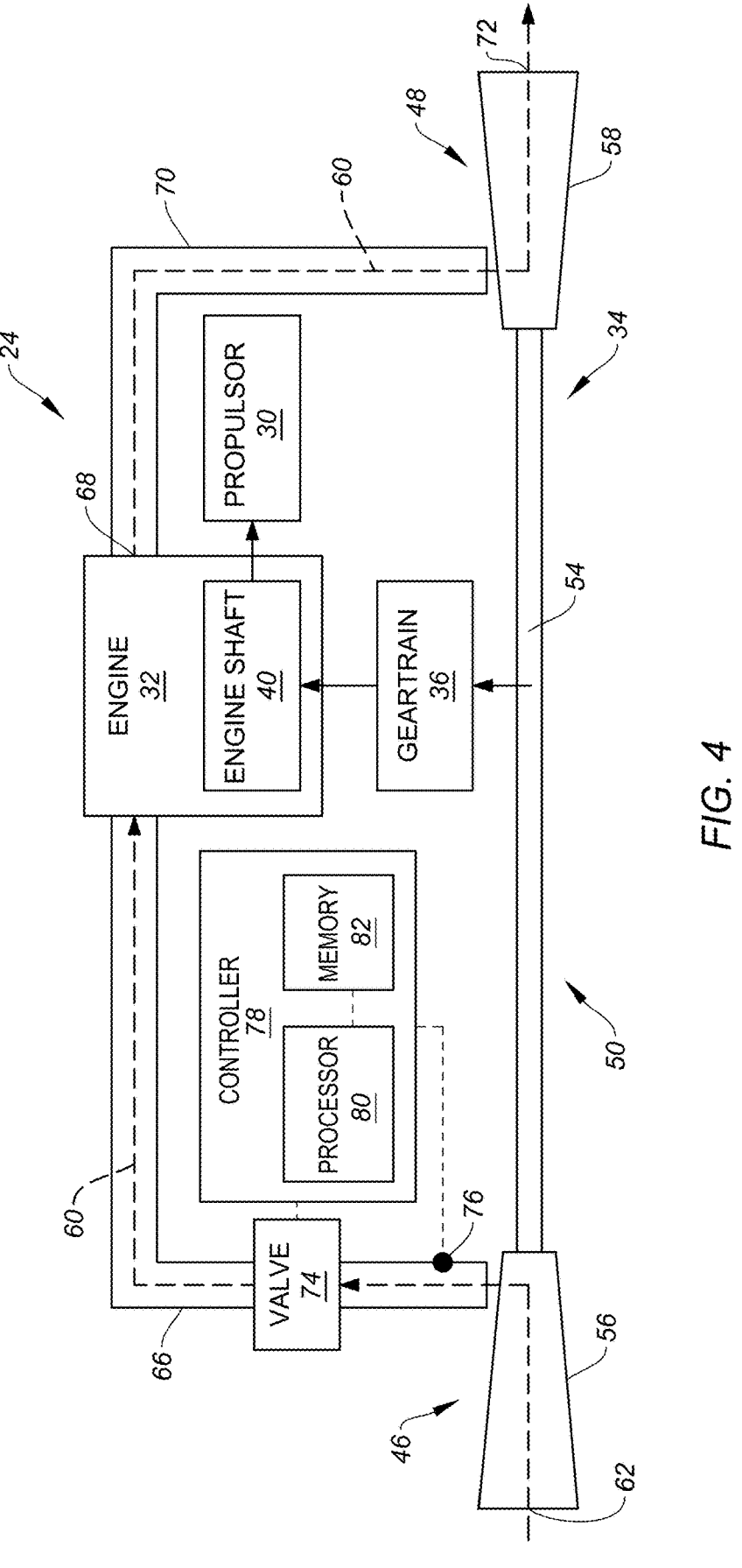
FIG. 4 schematically illustrates a portion of another powerplant assembly for the aircraft, in accordance with one or more embodiments of the present disclosure.

Referring to FIG. 4, in some embodiments, the powerplant assembly 24 may further include a pressure sensor 76 and a controller 78. The pressure sensor 76 is connected in fluid communication with the gas flow path 60 at (e.g., on, adjacent, or proximate) the duct assembly 66. For example, the pressure sensor 76 may be disposed at (e.g., on, adjacent, or proximate) and/or upstream of the overspeed protection valve 74 (e.g., between the overspeed protection valve 74 and the compressor section 46 along the gas flow path 60). The pressure sensor 76 is configured to measure a pressure within the duct assembly 66 and generate a signal (e.g., an electrical or electronic signal) proportional to the measured pressure The controller 78 is connected in signal communication with the overspeed protection valve 74 (e.g., a solenoid or other actuator of the overspeed protection valve 74) and the pressure sensor 76. The controller 78 includes a processor 80 connected in signal communication with memory 82. The processor 80 may include any type of computing device, computational circuit, processor(s), central processing unit (CPU), graphics processing unit (GPU), computer, or the like capable of executing a series of instructions that are stored in memory 82. Instructions can be directly executable or can be used to develop executable instructions. For example, instructions can be realized as executable or nonexecutable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the controller 78 and its processor 80 to accomplish the same algorithmically and/or by coordination of powerplant assembly 24 components including, but not limited to, the overspeed protection valve 74 and the pressure sensor 76. The memory 82 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or nonvolatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the controller 78. The controller 78 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the controller 78 and external electrical or electronic devices may be via a hardwire connection or via a wireless connection. A person of skill in the art will recognize that portions of the controller 78 may assume various forms (e.g., digital signal processor, analog device, etc.).

The controller 78 may form or otherwise be part of an engine control unit (ECU) for the engine 32. The ECU may control operating parameters of the engine 32 including, but not limited to, fuel flow, engine shaft 40 torque and/or rotation speed, etc. so as to control an engine power or performance of the engine 32. In some embodiments, the ECU may be part of a full authority digital engine control (FADEC) system for the powerplant assembly 24.

The controller 78 (e.g., the memory 82) may include instructions which, when executed by the processor 80, cause the controller 78 and/or its processor 80 to measure the pressure within the duct assembly 66 along the gas flow path 60, identify a presence or an absence of a low-pressure condition within the duct assembly 66 using the measured pressure, and control the overspeed protection valve 74 to remain in or change position to the closed state in response to identification of the low-pressure condition. The controller 78 may measure the gas flow path 60 pressure using the output signal from the pressure sensor 76. The controller 78 may identify the presence or the absence of the low-pressure condition by comparing the measured pressure to a pressure threshold. For example, the controller 78 may identify the presence of the low-pressure condition where the measured pressure is less than the pressure threshold and the absence of the low-pressure condition where the measured pressure is greater than the pressure threshold. During operation of the engine 32 and in response to identifying the low-pressure condition, the controller 78 may control the overspeed protection valve 74 or an actuator of the overspeed protection valve 74 to position the overspeed protection valve 74 in the closed state to facilitate overspeed protection for the bladed turbine rotor 58 as described above.

Figure 5:
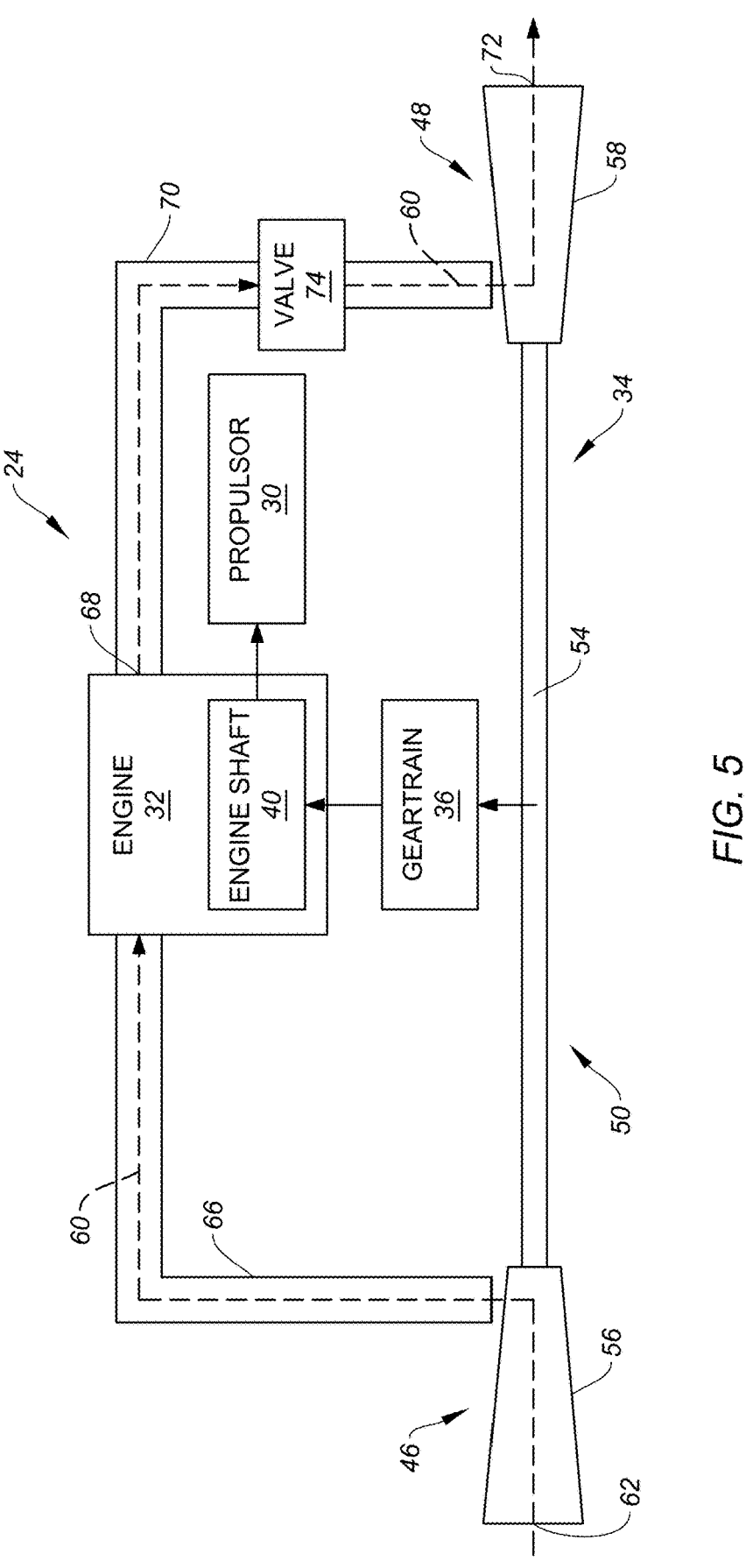
FIG. 5 schematically illustrates a portion of another powerplant assembly for the aircraft, in accordance with one or more embodiments of the present disclosure.

Referring to FIG. 5, in some embodiments, the overspeed protection valve 74 may alternatively be disposed on the gas flow path 60 downstream of the engine 32 (e.g., the engine exhaust 68). For example, the overspeed protection valve 74 of FIG. 3 may be disposed on the duct assembly 70 along and further forming the gas flow path 60. In the open state, the overspeed protection valve 74 may permit air flow through the duct assembly 70 from the engine 32 (e.g., the engine exhaust 68) to the turbine section 48 along the gas flow path 60. In the closed state, the overspeed protection valve 74 obstructs all or substantially all air flow through the duct assembly 70 from the engine 32 (e.g., the engine exhaust 68) to the turbine section 48 along the gas flow path 60.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise.

For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A powerplant assembly for an aircraft, the powerplant assembly comprising:
an engine including an air intake and an engine exhaust;
a turbocompressor including a compressor section, a turbine section, and a rotational assembly, the rotational assembly including a turbocompressor shaft, a bladed compressor rotor of the compressor section, and a turbine rotor of the turbine section, the turbocompressor shaft interconnecting the bladed compressor rotor and the bladed turbine rotor;
the engine and the turbocompressor forming a gas flow path of the powerplant assembly, the gas flow path extending from the compressor section to the air intake, through the engine, and from the engine exhaust to the turbine section;
an overspeed protection valve forming a portion of the gas flow path, the overspeed protection valve positionable in an open state and a closed state, the overspeed protection valve in the open state operable to direct a gas flow along the gas flow path, the overspeed protection valve in the closed state operable to obstruct the gas flow along the gas flow path to the turbine section;
a pressure sensor connected in fluid communication with the gas flow path upstream of the overspeed protection valve; and
a controller connected in signal communication with the overspeed protection valve and the pressure sensor, the controller including a processor connected in signal communication with a non-transitory memory storing instructions which, when executed by the processor, cause the processor to:
measure a gas pressure along the gas flow path using the pressure sensor;
identify a presence or an absence of a low-pressure condition using the measured gas pressure; and
control the overspeed protection valve to change position from the open state to the closed state in response to identifying the presence of the low-pressure condition.

2. The powerplant assembly of claim 1, wherein the engine includes an engine shaft, and the engine shaft is coupled with the turbocompressor shaft.

3. The powerplant assembly of claim 2, further comprising a geartrain coupling the engine shaft and the turbocompressor shaft.

4. The powerplant assembly of claim 2, further comprising a propulsor rotor, and the propulsor rotor is coupled with the engine shaft and the turbocompressor shaft.

5. The powerplant assembly of claim 1, further comprising a duct assembly forming the gas flow path from the compressor section to the engine, and the overspeed protection valve is disposed at the duct assembly.

6. The powerplant assembly of claim 1, further comprising a duct assembly forming the gas flow path from the engine to the turbine section, and the overspeed protection valve is disposed at the duct assembly.

7. The powerplant assembly of claim 1, wherein identifying the presence or the absence of the low-pressure condition includes comparing the measured gas pressure to a pressure threshold, the presence of the low-pressure condition identified where the measured pressure is less than the pressure threshold.

8. A powerplant assembly for an aircraft, the powerplant assembly comprising:
a propulsor rotor;
an engine including an air intake, an engine exhaust, and an engine shaft, the engine shaft coupled with the propulsor rotor;
a turbocompressor including a compressor section, a turbine section, and a rotational assembly, the rotational assembly including a bladed compressor rotor of the compressor section and a turbine rotor of the turbine section, the rotational assembly coupled with the propulsor rotor;

the engine and the turbocompressor forming a gas flow path of the powerplant assembly, the gas flow path extending from the compressor section to the air intake, through the engine, and from the engine exhaust to the turbine section; and an overspeed protection valve forming a portion of the gas flow path, the overspeed protection valve positionable in an open state and a closed state, the overspeed protection valve in the open state operable to direct a gas flow along the gas flow path, the overspeed protection valve in the closed state operable to obstruct the gas flow along the gas flow path to the turbine section, the overspeed protection valve operable to sense a gas pressure along the gas flow path and change position from the open state to the closed state when the gas pressure decreases to a closing pressure setting of the overspeed protection valve.

9. The powerplant assembly of claim 8, further comprising a duct assembly forming the gas flow path from the compressor section to the engine, and the overspeed protection valve is disposed at the duct assembly.

10. The powerplant assembly of claim 8, further comprising a duct assembly forming the gas flow path from the engine to the turbine section, and the overspeed protection valve is disposed at the duct assembly.

11. A method for preventing an overspeed condition of a bladed turbine rotor of a turbocompressor of a powerplant assembly for an aircraft, the method comprising:

driving rotation of a propulsor rotor with an engine shaft of an engine, the engine shaft coupled with the propulsor rotor;

directing compressed air from a compressor section of the turbocompressor to the engine along a gas flow path;

directing combustion exhaust gas from the engine to a turbine section of the turbocompressor to drive rotation of a rotational assembly of the turbocompressor, the rotational assembly including the bladed turbine rotor at the turbine section and a bladed compressor rotor at the compressor section; and preventing an overspeed condition of the bladed turbine rotor by obstructing the gas flow path with an overspeed protection valve by changing a position of the overspeed protection valve from an open state to a closed state to in response to a decrease in gas pressure within the gas flow path between the compressor section and the turbine section.

12. The method of claim 11, wherein preventing the overspeed condition of the bladed turbine rotor includes preventing the overspeed condition of the bladed turbine rotor with the bladed turbine rotor decoupled from the bladed compressor rotor.

13. The method of claim 11, wherein driving rotation of the propulsor rotor with the engine shaft includes additionally driving rotation of the propulsor rotor with the rotational assembly, and the rotational assembly is coupled with the propulsor rotor.

14. The method of claim 11, wherein obstructing the gas flow path with the overspeed protection valve includes obstructing the compressed air from the compressor section to the engine along the gas flow path.

15. The method of claim 11, wherein obstructing the gas flow path with the overspeed protection valve includes obstructing the combustion exhaust gas from the engine to the turbine section along the gas flow path.

* * * * *